US008365139B2

(12) United States Patent
Szpak

(10) Patent No.: US 8,365,139 B2
(45) Date of Patent: *Jan. 29, 2013

(54) APPLYING CODING STANDARDS IN GRAPHICAL PROGRAMMING ENVIRONMENTS

(75) Inventor: Peter Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 190 days.

This patent is subject to a terminal disclaimer.

(21) Appl. No.: 12/873,098

(22) Filed: Aug. 31, 2010

(65) Prior Publication Data

US 2010/0333062 A1     Dec. 30, 2010

Related U.S. Application Data

(63) Continuation of application No. 11/015,851, filed on Dec. 16, 2004, now Pat. No. 7,797,673.

(51) Int. Cl.
*G06F 9/44* (2006.01)

(52) U.S. Cl. ........ 717/105; 717/104; 717/121; 717/128; 717/131

(58) Field of Classification Search ........................ None
See application file for complete search history.

(56) References Cited

U.S. PATENT DOCUMENTS

| | | | |
|---|---|---|---|
| 5,566,295 A | 10/1996 | Cypher et al. | |
| 6,895,578 B1 | 5/2005 | Kolawa et al. | |
| 6,920,612 B2* | 7/2005 | Makinen | 715/705 |
| 7,543,281 B2* | 6/2009 | King et al. | 717/140 |
| 7,810,069 B2* | 10/2010 | Charisius et al. | 717/110 |
| 2001/0052108 A1* | 12/2001 | Bowman-Amuah | 717/1 |
| 2002/0112214 A1 | 8/2002 | Keller et al. | |
| 2002/0133811 A1* | 9/2002 | Duftler et al. | 717/140 |
| 2002/0178246 A1 | 11/2002 | Mayer | |
| 2003/0110472 A1* | 6/2003 | Alloing et al. | 717/122 |
| 2004/0261063 A1* | 12/2004 | Wang et al. | 717/136 |
| 2005/0015675 A1* | 1/2005 | Kolawa et al. | 714/38 |
| 2005/0015743 A1* | 1/2005 | O'Brien | 717/104 |
| 2005/0060685 A1* | 3/2005 | Franz et al. | 717/109 |
| 2005/0075831 A1* | 4/2005 | Ilic | 702/179 |
| 2005/0120276 A1* | 6/2005 | Kolawa et al. | 714/38 |
| 2006/0123389 A1* | 6/2006 | Kolawa et al. | 717/101 |

FOREIGN PATENT DOCUMENTS

EP    1376389 A2    1/2004

OTHER PUBLICATIONS

Hatton Les, "Safer Language Subsets: an overview and a case history, MISRA C," Computing Laboratory, University of Kent at Canterbury, pp. 1-19 (2002).
Kwon, Jagun et al., "Assessment of the Java Programming Language for Use in High Integrity Systems," ACM SIGPLAN Notices, vol. 38(4):34-46 (2003).
Misra, The motor Industry Software Reliability Association, "MISRA-C:2004, Guidelines for the use of the C language in critical systems," Mira Limited, pp. 1-111 (2004).
International Search Report Application No. PCT/US2005/024981, 6 pages, dated Dec. 16, 2004.

* cited by examiner

*Primary Examiner* — Isaac Tecklu
(74) *Attorney, Agent, or Firm* — Nelson Mullins Riley & Scarborough LLP

(57) ABSTRACT

Graphical programming or modeling environments in which a coding standard can be applied to graphical programs or models are disclosed. The present invention provides mechanisms for applying the coding standard to graphical programs/models in the graphical programming/modeling environments. The mechanisms may detect violations of the coding standard in the graphical model and report such violations to the users. The mechanisms may automatically correct the graphical model to remove the violations from the graphical model. The mechanisms may also automatically avoid the violations in the simulation and/or code generation of the graphical model.

24 Claims, 12 Drawing Sheets

Summary

MISRA-C report for Simulink model 'misraviolations'. The report is generated based on the following mdel configuration settings.

| Rule | Description | Violation Level | Check Enabled | Mitigation Strategy | Automatic Avoidance Enabled |
|---|---|---|---|---|---|
| 1 | All code shall conform to ISO 9899 standard C, with no extensions permitted | Required | Yes | None Required | N/A |
| 2 | Code written in languages other than C should only be used if there is a defined interface standard for object code to which the compilers/assemblers for both languages conform | Advisory | Yes | None Required | N/A |
| 50 | point variables shall not be tested for exact equality or inequality | Required | Yes | Tolerance: 1e-4 | Yes |
| : | | | | | |

Violations

Rule 50

Description: Floating point variables shall not be tested for exact equality or inequality
Occurrences: Violated 1 time The following block in Simulink is comparing two single precision numbers for exact equality:

<root>/Relational Operator

Your mitigation strategies are:

1. Enable automatic violation avoidance for Rule 50 (enable now)
2. Replace current diagram implementation with a MISRA compliant implementation (replace now)

*Fig. 10*

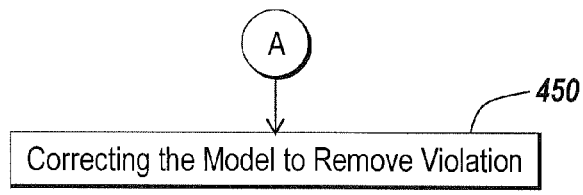

*Fig. 11*

APPLYING CODING STANDARDS IN GRAPHICAL PROGRAMMING ENVIRONMENTS

RELATED APPLICATIONS

The present application is a continuation of U.S. application Ser. No. 11/015,851, entitled "Applying Coding Standards in Graphical Programming Environments," filed Dec. 16, 2004, the contents of which are herein incorporated by reference.

FIELD OF THE INVENTION

The present invention relates to graphical programming or modeling environments, in particular to methods, systems and computer program products for applying coding standards in the graphical programming or modeling environments.

BACKGROUND OF THE INVENTION

In text-based programming languages, such as C, C++ and Java, coding standards have been applied to promote higher quality of programs. An example of such coding standards can be found in MISRA-C, which is a popular standard for C code created by the Motor Industry Software Reliability Association (MISRA). MISRA-C has been developed to provide guidelines for the use of the C language in critical systems. MISRA-C is becoming more important for real-time embedded applications within the automotive and aerospace industries.

Recently, various classes of graphical programs have been used to describe computations that can be performed on application-specific computing hardware, such as a computer, microcontroller, FPGA, and custom hardware. Classes of such graphical programs may include time-based block diagrams such as those found within Simulink® from The MathWorks, Inc. of Natick, Mass., state-based and flow diagrams such as those found within Stateflow® from The MathWorks, Inc. of Natick, Mass., and data-flow diagrams. A common characteristic among these various forms of block diagrams is that they define semantics on how to execute the diagram.

The graphical programs are useful particularly for designing and simulating complex systems arising in application domains, such as automotive, aerospace, and communication engineering. Safety and security are important factors with the systems implemented in these application domains. However, the conventional graphical programming environments do not provide any mechanisms for checking the compliance of the MISRA-C guidelines or other safety coding standards in the graphical programs. Therefore, it is desired to provide mechanisms to apply various coding standards, including MISRA-C, to graphical programs.

SUMMARY OF THE INVENTION

The present invention provides graphical programming or modeling environments in which coding standards can be applied to graphical programs or models generated in the graphical programming or modeling environments. The terms "program/programming" and "model/modeling" will be used interchangeably in the description of the present invention. The present invention provides mechanisms for applying coding standards to graphical programs/models in the graphical programming/modeling environments.

The mechanisms of the present invention may enable users to select a coding standard that is applied to a graphical model. The present invention may provide tools for enabling the users to customize the coding standard and the strategies for applying the coding standard to the graphical model. The mechanisms may detect violations of the selected coding standard in the graphical model and report such violations to the users. The mechanisms of the present invention may automatically correct the graphical model to remove the violations from the graphical model. The mechanisms may also automatically avoid the violations in the simulation and/or code generation of the graphical model.

In accordance with one aspect of the present invention, a method is provided for applying a coding standard to a model in a modeling environment. The method includes the step of providing a coding standard in the modeling environment. The method also includes the step of applying the coding standard to the model to find violations of the coding standard in the model.

In another aspect of the invention, a system is provided for applying a coding standard to a model in a modeling environment. The system includes storage for containing at least a coding standard in the modeling environment. The system also includes a processor for applying the coding standard to the model to find violations of the coding standard in the model.

In another aspect of the invention, a computer program product is provided for holding instructions executed in a computer to apply a coding standard to a model in a modeling environment. The instructions are executed to provide a coding standard in the modeling environment. The instructions are also executed to apply the coding standard to a model to find violations of the coding standard in the model.

BRIEF DESCRIPTION OF THE DRAWINGS

The aforementioned features and advantages, and other features and aspects of the present invention, will become better understood with regard to the following description and accompanying drawings, wherein:

FIG. 10 depicts an exemplary MISRA-C report for a Simulink® model;

FIG. 11 is a flow chart showing an exemplary operation of the illustrative embodiment of the present invention for automatically correcting the model to remove violations;

DETAILED DESCRIPTION

Figure 1:
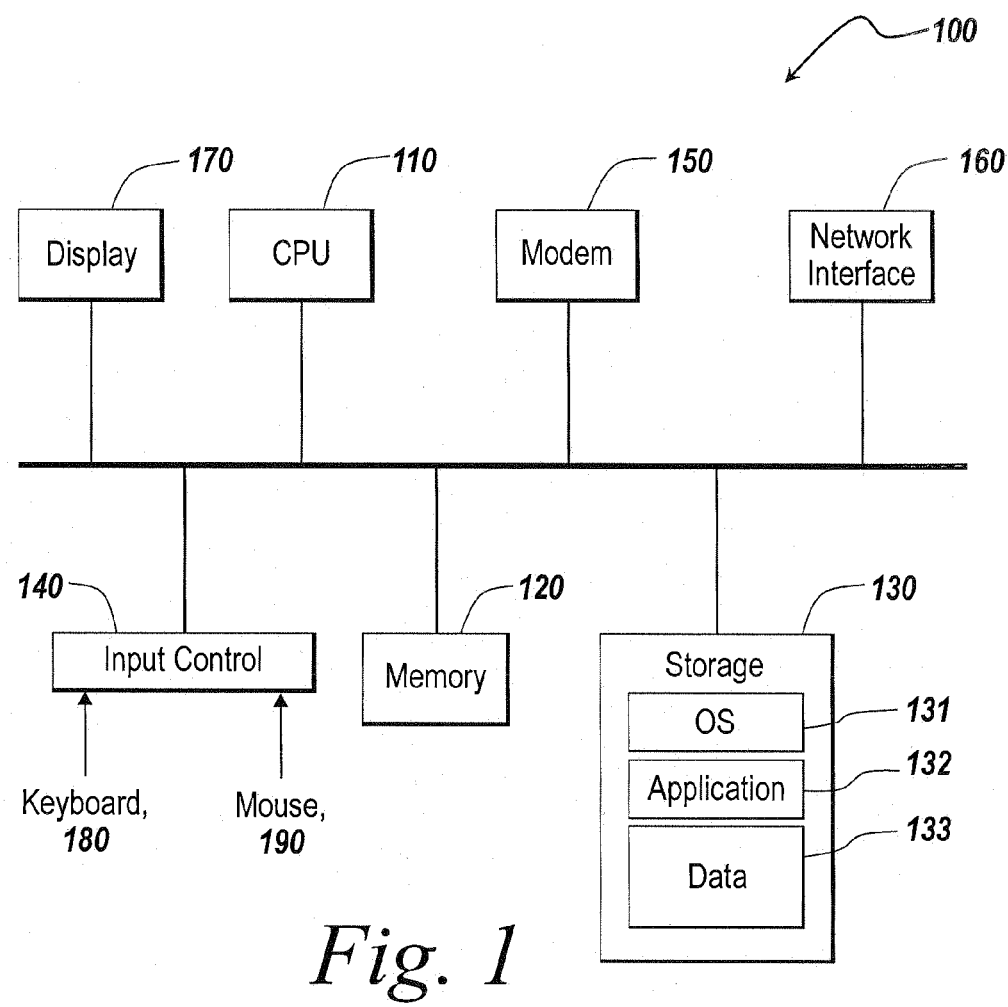
FIG. 1 shows an exemplary computing device suitable for practicing the illustrative embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a graphical programming or modeling environment in which a graphical program or model is simulated/executed or code is generated for the model. The terms "program/programming" and "model/modeling" will be interchangeably used in the description of the illustrative embodiment. In the description of the illustrative embodiment, the simulation of the graphical program/model is also referred to as the execution of the program/model.

The illustrative embodiment will be described below solely for illustrative purposes relative to a time-based block diagram environment and/or a state-based and flow diagram environment. Although the illustrative embodiment will be described relative to the time-based block diagram environment and/or the state-based and flow diagram environment, one of skill in the art will appreciate that the present invention may apply to other graphical programming/modeling environments, including data flow diagram environments and Unified Modeling Language (UML) environments, as long as the graphical model has some notion of semantics that allows it to be transformed into an executable for a computer processor/microcontroller or directly synthesized in application-specific hardware.

An exemplary time-based block diagram environment can be found in Simulink® from The MathWorks, Inc. of Natick, Mass. Simulink® provides tools for modeling and simulating a variety of dynamic systems in one integrated, graphical environment. Simulink® enables users to design a block diagram for a target system, simulate the system's behavior, analyze the performance of the system, and refine the design of the system. Simulink® allows users to design target systems through a user interface that allows drafting of block diagrams of the target systems. All of the blocks in a block library provided by Simulink® and other programs are available to users when the users are building the block diagram of the target systems. Individual users may be able to customize this model block to: (a) reorganize blocks in some custom format, (b) delete blocks they do not use, and (c) add custom blocks they have designed. The blocks may be dragged through some human-machine interface (such as a mouse or keyboard) from the block library on to the window (i.e., model canvas). Simulink® also allows users to simulate the designed target systems to determine the behavior of the systems.

Stateflow® from The MathWorks, Inc. of Natick, Mass., provides an exemplary state-based and flow diagram environment. Stateflow® provides a graphical environment for modeling and designing event-driven systems. Stateflow® describes complex system behavior using finite state machine theory, flow diagram notations, and state-transition diagrams. Stateflow® models state diagrams that graphically represent hierarchical and parallel states and the event-driven transitions between the states of the systems. Stateflow® is integrated with Simulink®, which enables each of the state diagrams to be represented as its own block. Based on the state diagrams created in Stateflow®, Simulink® executes the systems to analyze the behavior of the systems.

The illustrative embodiment will be described below relative to a Simulink® model and a Stateflow® model. Nevertheless, those of skill in the art will appreciate that the present invention may be practiced relative to models implemented in other graphical modeling environments, including but not limited to LabVIEW from National Instruments Corporation of Austin, Tex., and Rational Rose from IBM of White Plains, N.Y.

The illustrative embodiment of the present invention provides a block diagram environment in which a coding standard can be applied to a block diagram generated in the block diagram environment. The illustrative embodiment enables users to select a coding standard that is applied to the block diagram. The illustrative embodiment also provides APIs that enable the users to customize the coding standard and the strategies for applying the coding standard to the block diagram. The illustrative embodiment detects violations of the selected coding standard in the block diagram and reports such violations to the users. The illustrative embodiment automatically corrects the block diagram to remove the violations from the block diagram. Also, the illustrative embodiment automatically avoids the violations in the simulation and/or code generation of the block diagram.

FIG. 1 is an exemplary computing device 100 suitable for practicing the illustrative embodiment of the present invention, which provides a block diagram environment. One of ordinary skill in the art will appreciate that the computing device 100 is intended to be illustrative and not limiting of the present invention. The computing device 100 may take many forms, including but not limited to a workstation, server, network computer, quantum computer, optical computer, bio computer, Internet appliance, mobile device, a pager, a tablet computer, and the like.

The computing device 100 may be electronic and include a Central Processing Unit (CPU) 110, memory 120, storage 130, an input control 140, a modem 150, a network interface 160, a display 170, etc. The CPU 110 controls each component of the computing device 100 to provide the block diagram environment and to apply a coding standard to a block diagram in the block diagram environment. The memory 120 temporarily stores instructions and data and provides them to the CPU 110 so that the CPU 110 operates the computing device 100 and runs the block diagram environment. The storage 130 usually contains software tools for applications. The storage 130 includes, in particular, code 131 for the operating system (OS) of the device 100, code 132 for applications running on the operation system including applications for providing the block diagram environment, and data 133 for block diagrams created in the block diagram environment and for one or more coding standards applied to the block diagrams.

The input control 140 may interface with a keyboard 180, a mouse 190, and other input devices. The computing device 100 may receive through the input control 140 input data necessary for creating block diagrams, such as the selection of the attributes and operations of component blocks in the block diagrams. The computing device 100 may also receive input data for applying a coding standard to a block diagram, such as data for selecting the coding standard, data for customizing the coding standard, data for correcting the violation of the coding standard in the block diagram, etc. The computing device 100 may display in the display 170 user interfaces for the users to edit the block diagrams. The computing device 100 may also display other user interfaces, such as a user interface for selecting a coding standard, a user interface for customizing the coding standard, a user interface for displaying a corrected block diagram that removes the violation of the coding standard, etc.

Figure 2:
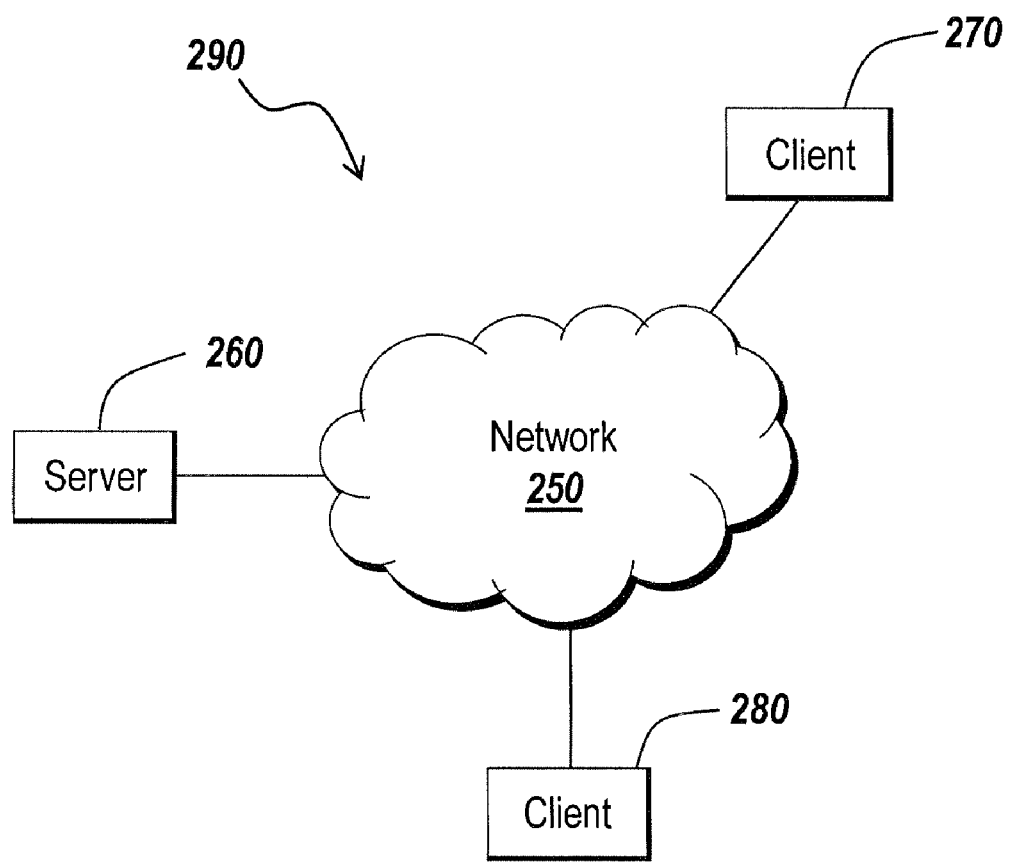
FIG. 2 shows an exemplary network environment suitable for practicing the illustrative embodiment of the present invention.

FIG. 2 is an exemplary network environment 290 suitable for the distributed implementation of the illustrative embodiment. The network environment 290 may include a server 260 coupled to clients 270 and 280 via a communication network 250. The server 260 and clients 270 and 280 can be implemented using the computing device 100 depicted in FIG. 1. The network interface 160 and the modem 150 of the computing device 100 enable the server 260 to communicate with the clients 270 and 280 through the communication network 250. The communication network 250 may include Internet, intranet, LAN (Local Area Network), WAN (Wide Area Network), MAN (Metropolitan Area Network), etc. The communication facilities can support the distributed implementations of the present invention.

In the network environment 290, the server 260 may provide the clients 270 and 280 with software components or products under a particular condition, such as a license agreement. The software components or products may include those for providing a block diagram environment and those for creating a block diagram in the block diagram environment. The software components or products may also include those for providing one or more coding standards and those for applying the coding standard to the block diagram. The server 260 may send the clients 270 and 280 the software components or products under a specific license agreement. An exemplary licensing scheme is described in more detail in U.S. patent application Ser. No. 10/896,671 entitled "DYNAMIC LICENSING IN A DISTRIBUTED SYSTEM," which is incorporated herewith by reference.

Figure 3:
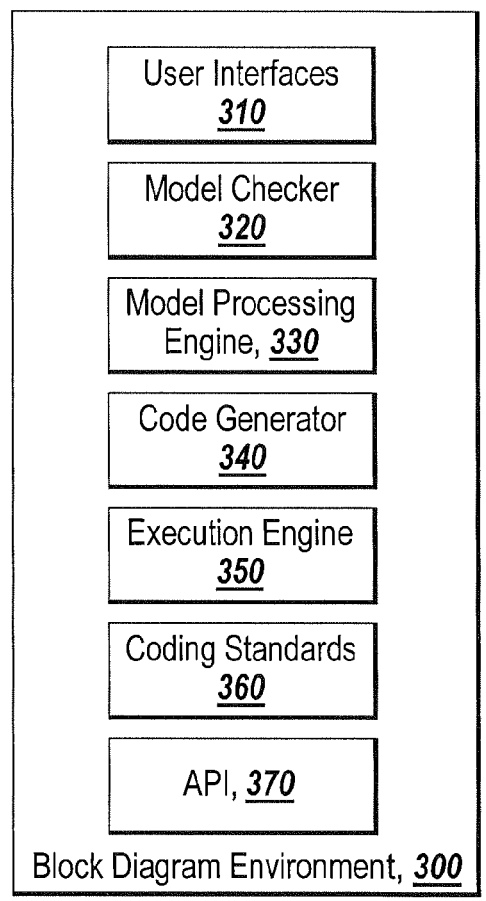
FIG. 3 depicts an exemplary block diagram environment provided in the illustrative embodiment of the present invention.
Figure 4:
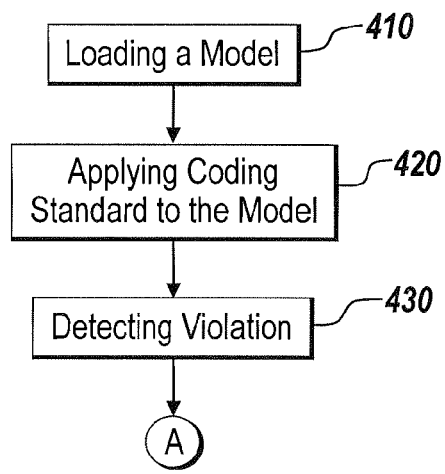
FIG. 4 is a flow chart showing an exemplary operation of the illustrative embodiment of the present invention for applying coding standard to a model in the block diagram environment.

FIG. 3 depicts an exemplary block diagram environment 300 provided in the illustrative embodiment. The block diagram environment 300 may include a user interfaces (UIs) 310, a checker 320 a model processing engine 330, a code generator 340, a model execution engine 350, coding standards 360 and application program interfaces (APIs) 370. FIG. 4 is a flow chart showing an exemplary operation of the block diagram environment 300. A block diagram is loaded or created in the block diagram environment 300 (step 410). Users may create a new block diagram or edit an existing block diagram using the user interfaces 310. The user interfaces 310 allow users to perform such actions as draw, edit, annotate, save, and print out block diagram representations of systems. The block diagram environment 300 may provide a graphical user interface (GUI) component that allows drafting of the block diagram by the users. The block diagram environment 300 may allow users to specify the parameters for the block when they use it in their block diagrams. In Simulink®, there is also a textual interface with a set of commands that allow interaction with the graphical interface, such as the textual interface provided in MATLAB®. Using this textual interface, users may write special scripts that perform automatic editing operations on the block diagram.

Graphical Programs/Models

Figure 5:
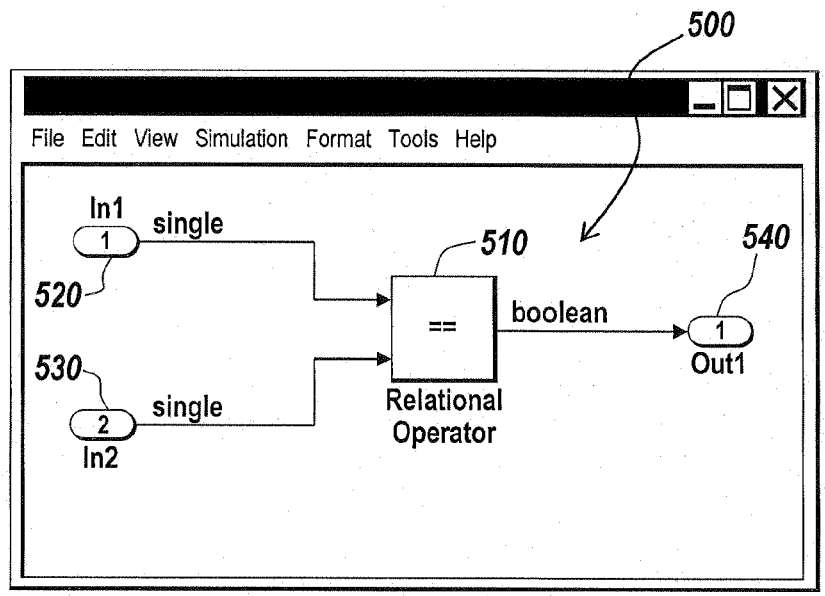
FIG. 5 depicts an exemplary model loaded or created in the block diagram environment.
Figure 6:
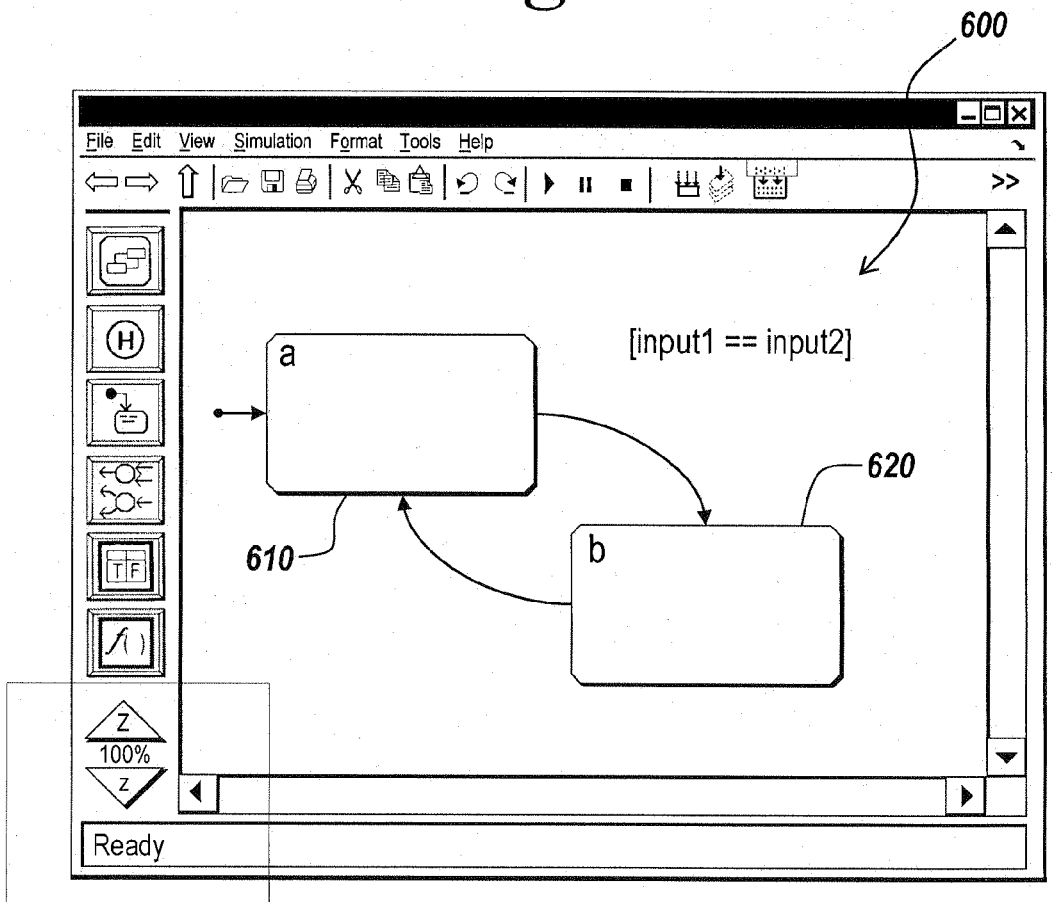
FIG. 6 depicts another exemplary model loaded or created in the block diagram environment, containing a state chart.

FIGS. 5 and 6 depict exemplary Simulink® and Stateflow® models 500 and 600, respectively, created or loaded in the block diagram environment 300. Those of ordinary skill in the art will appreciate that these models 500 and 600 are merely illustrative and do not limit the scope of the present invention. In FIG. 5, the model 500 includes a relational operator 510 that compares input signals received from input ports 520 and 530 and outputs a Boolean value to an output port 540. In FIG. 6, the model 600 includes two states 610 and 620. The first state 610 can transit to the second state 620 if two input signals (input1 and input2) are the same. One of ordinary skill in the art will appreciate that the models 500 and 600 depicted in FIGS. 5 and 6, respectively, may be a portion of models, which include additional portions.

Figure 7:
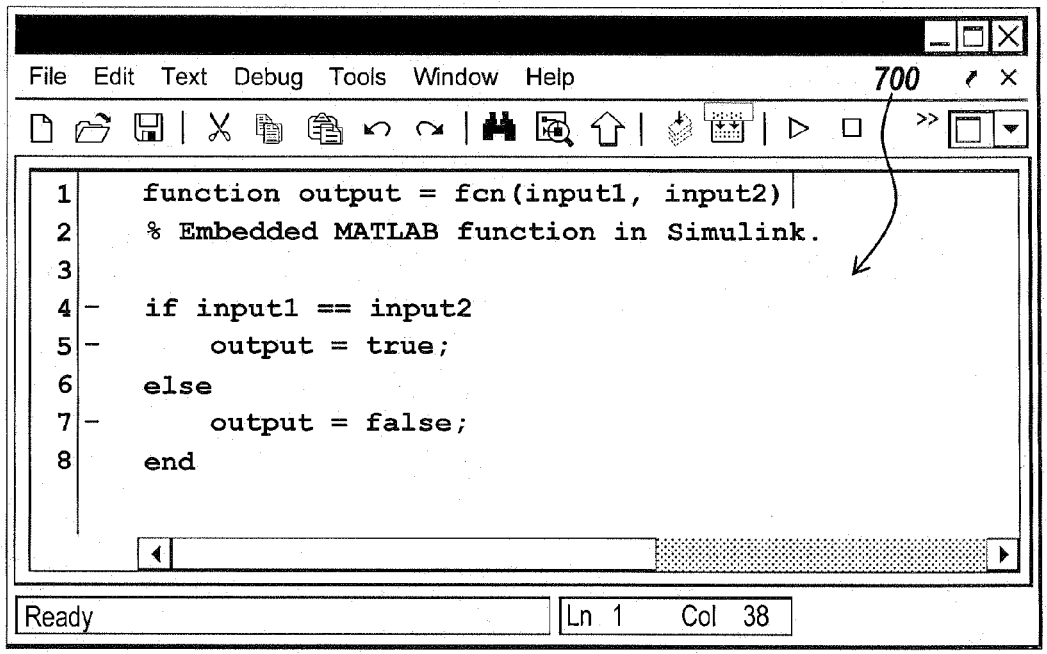
FIG. 7 depicts an exemplary text-based code embedded in a model in the block diagram environment.

In the block diagram environment 300, the block diagrams are represented schematically as a collection of blocks interconnected by lines. The blocks in a block diagram are the fundamental and mathematical elements of the block diagram. The mathematical functions of the blocks are embedded in the graphical representation of the block diagram. FIG. 7 is an exemplary text-based MATLAB® code 700 embedded in a Simulink® model. In the embedded MATLAB® code 700, the first input signal (input1) is compared with the second input signal (input2). If the first input signal (input1) equals to the second input signal (input2), the output has a Boolean value, true. If the first input signal (input1) does not equal to the second input signal (input2), the output has a Boolean value, false.

Coding Standards

Referring back to FIG. 3, the block diagram environment 300 may include one or more coding standards 360, such as MISRA-C, QAC, EC++, Spark and a customized coding standard. MISRA-C is originally developed to support the language requirements of the 1994 MISRA Guidelines, which specify the use of "a restricted subset of a standardized structured language" in automotive applications. For C, this means that the language must only be used as defined in the ISO standard. This therefore precludes K&R C (as defined in the First Edition of "The C Programming language" by Kernighan and Ritchie), C++ and proprietary extensions to the language. Exemplary rules in MISRA-C are listed below.

Rule 1 (required): All code shall conform to ISO 9899: 1990 "Programming languages—C", amended and corrected by ISO/IEC9899/COR1:1995, ISO/IEC9899/AMD1:1995, and ISO/IEC9899/COR2:1996.

Rule 3 (required): Assembly language shall be encapsulated and isolated.

Rule 9 (required): The character sequence /* shall not be used within a comment.

Rule 50 (required): Floating expressions shall not be tested for equality or inequality.

Rule 56 (required): The goto statement shall not be used.

Rule 57 (required): The continue statement shall not be used.

Rule 70 (required): Functions shall not call themselves directly or indirectly.

Rule 103 (required): >, >=, <, <= shall not be applied to pointer types except where they point the same array.

Figure 15:
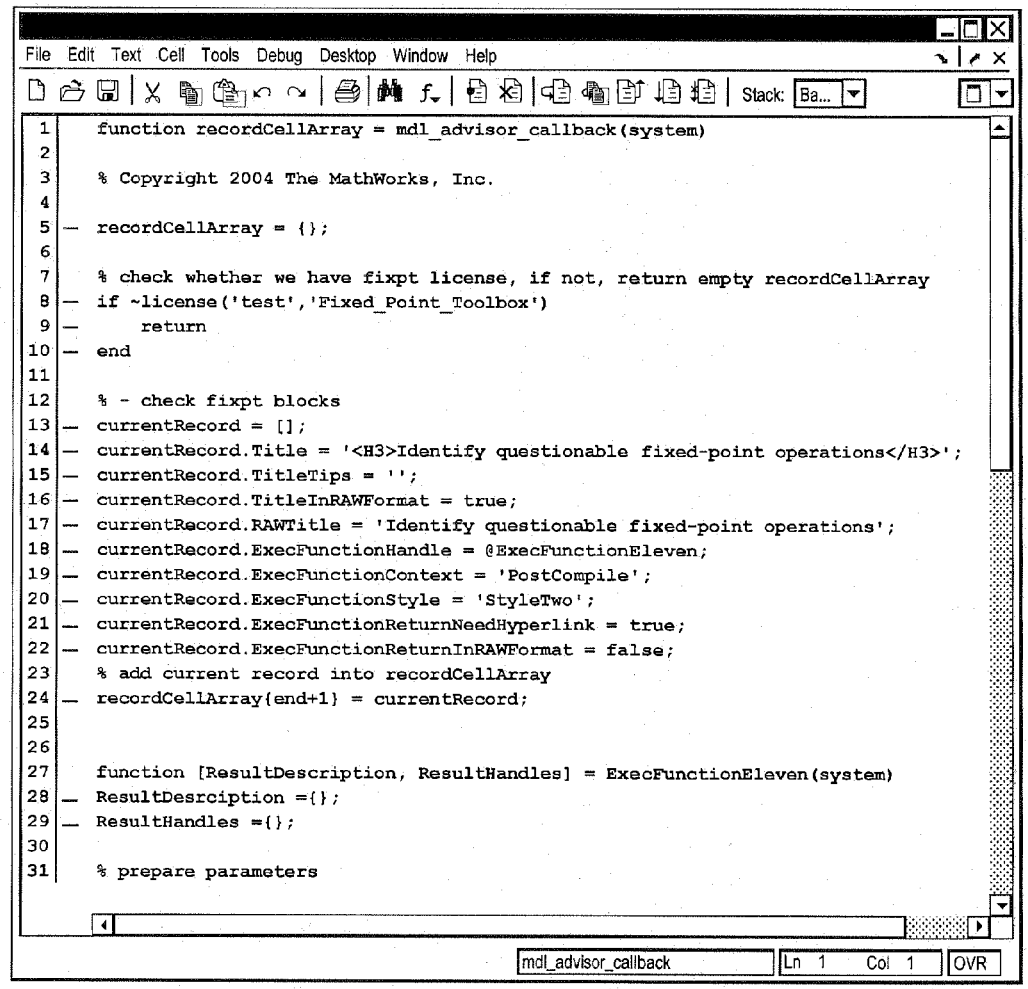
FIG. 15 is an exemplary API callback to implement a customized ("in-house") standard.

MISRA-C is an exemplary coding standard that can be applied to the block diagram in the illustrative embodiment. One of ordinary skill in the art will appreciate that the block diagram environment 300 may include any other coding standards, for example, QAC, EC++ and Spark. Also, a customized coding standard can be included in the block diagram environment 300. Users can customize the existing coding standards or their own coding standards using the application program interface (API) 370. The API 370 is a set of rules for writing function or subroutine calls that access functions in the block diagram environment 300. Applications or programs that use these rules or functions in the API calls can communicate with the block diagram environment 300. FIG. 15 is an exemplary API callback function to implement a custom ("in-house") coding standard. Using the callback function, users are able to seamlessly plug their own coding standards into the block diagram environment 300.

In customizing the coding standard, the API 370 may enable the users to disable various rules in the coding standard. That is, users are able to ignore one or more rules of the coding standard to improve, for example, code efficiency. For example, the goto statement is not permitted by MISRA-C Rule 56. However, users may permit goto statements in order to produce more efficient code as measured by ROM usage.

User Interface for Selecting a Coding Standard

Figure 8A:
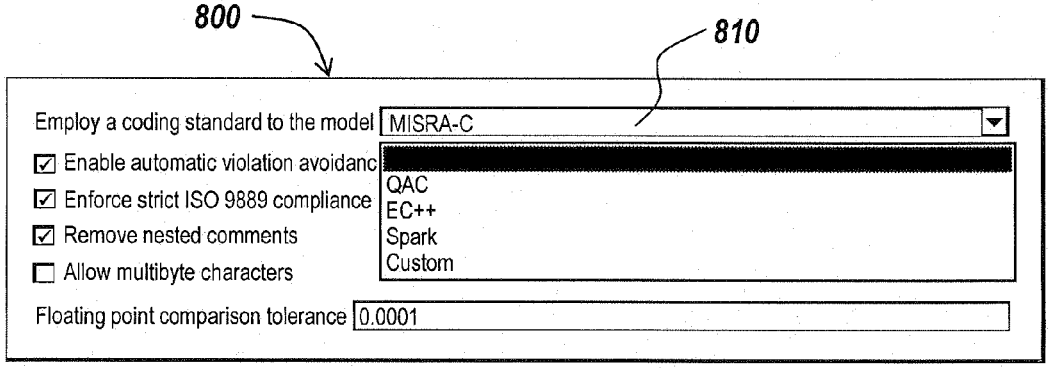
FIG. 8A is an exemplary user interface that enables users to select a coding standard.

The block diagram environment 300 may include multiple coding standards 360 and enable users to select one of the multiple coding standards 360 that is applied to the block diagram. FIG. 8A is an exemplary user interface 800 that enables users to select a coding standard. As depicted in FIG. 8A, the block diagram environment 300 may include multiple coding standards, including MISRA-C, QAC, EC++, Spark and a customized coding standard. One of ordinary skill in the art will appreciate that these options are illustrative examples, and that other coding standards can be applied. The user interface 800 includes an option 810 to select one of the coding standards provided in the block diagram environment 300. The user interface 800 may also provide more options for the users to select strategies for applying the selected coding standard to the block diagram.

Figure 8B:
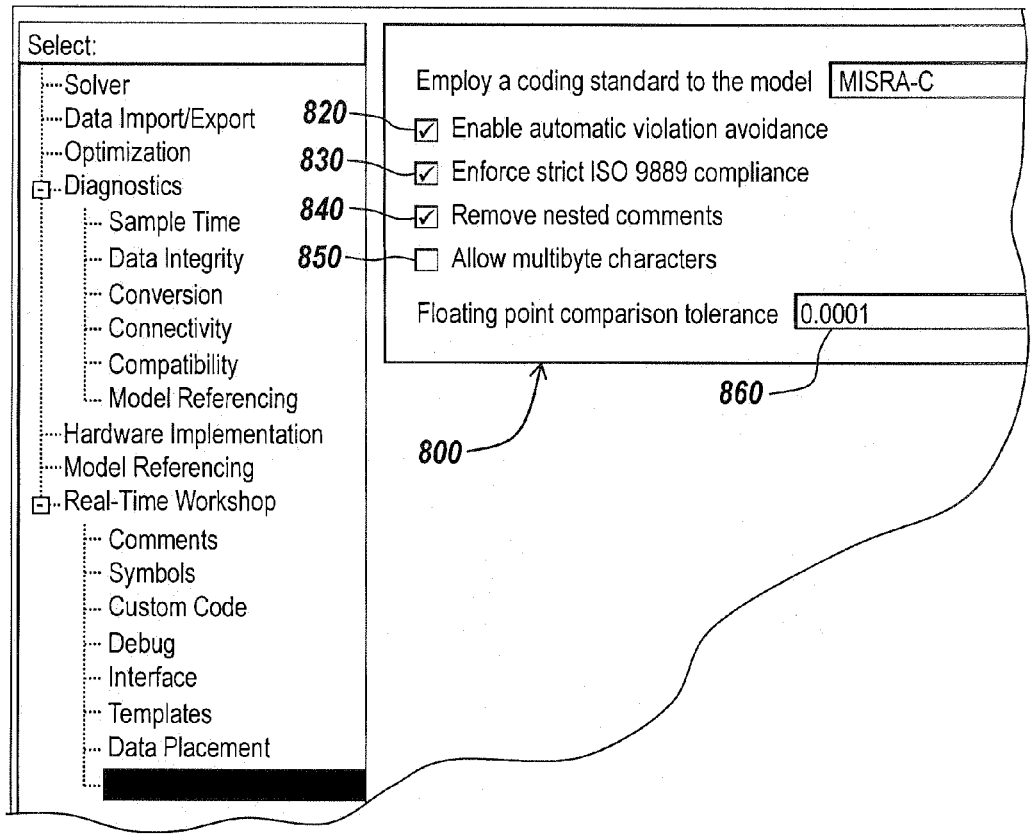
FIG. 8B is an exemplary user interface that enables users to control the rules and avoidance strategies to apply the coding standard selected in FIG. 8A.

FIG. 8B shows an exemplary user interface 800 that provides more options for users to select strategies for applying the selected MISRA-C coding standard to the block diagram. The options provided in the user interface 800 may include an option 820 to enable automatic violation avoidance in the simulation and/or code generation of the block diagram, which will be described below in more detail with reference to FIGS. 13, 14A and 14B. The user interface 800 may include additional options 830, 840 and 850 to enforce strict ISO 9889 compliance, to remove nested comments and to allow multiple-byte characters. One of ordinary skill in the art will appreciate that these options are illustrative and other options may be provided in the user interface 800. One of ordinary skill in the art will also appreciate that these options can vary depending on the selected coding standard.

The user interface 800 may enable the users to input data for correcting or avoiding the violation of the selected coding standard in the block diagram. For example, since MISRA-C does not allow the comparison of floating expressions for equality or inequality, the user interface 800 may enable the users to input a floating point comparison tolerance 860, as depicted in FIG. 8B. The floating point comparison tolerance can be used in the automatic correction of the block diagram, which will be described below in more detail with reference to FIGS. 11, 12A and 12B, and the automatic violation avoidance in the simulation and/or code generation of the block diagram, which will be described below in more detail with reference to FIGS. 13, 14A and 14B. One of ordinary skill in the art will appreciate that the input data of the floating point comparison tolerance 860 is illustrative and any other input data can be entered to correct or avoid the violations of the coding standard.

Reporting Violations

Referring back to FIGS. 3 and 4, when the block diagram is created or loaded in the block diagram environment 300, the checker 320 applies the selected coding standards to the block diagram (step 420) and finds any violations of the applied coding standard in the block diagram (step 430). The illustrative embodiment of the present invention may apply the coding standard to the graphical models, such as the models 500 and 600 depicted in FIGS. 5 and 6, or to the text-based code embedded in the graphical models, such as the MATLAB® code in FIG. 7.

Figure 9A:
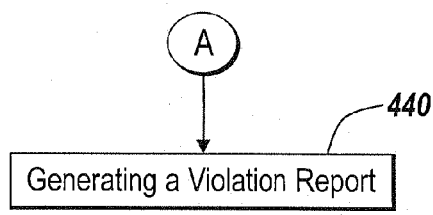
FIG. 9A is a flow chart showing an exemplary operation of the illustrative embodiment of the present invention for generating a violation report in the simulation and code generation of the model.

FIG. 9A is a flow chart showing an exemplary operation of the illustrative embodiment of the present invention for generating a violation report of the coding standard. If the checker 320 applies the selected coding standard to the block diagram and finds the violations of the coding standard, the checker 320 may generate a coding standard violation report for the block diagram. The block diagram environment 300 may provide a user interface 310 for displaying the violation report to the users. FIG. 10 depicts an exemplary user interface 1000 that displays MISRA-C violation report for the Simulink® model 500.

Figure 9B:
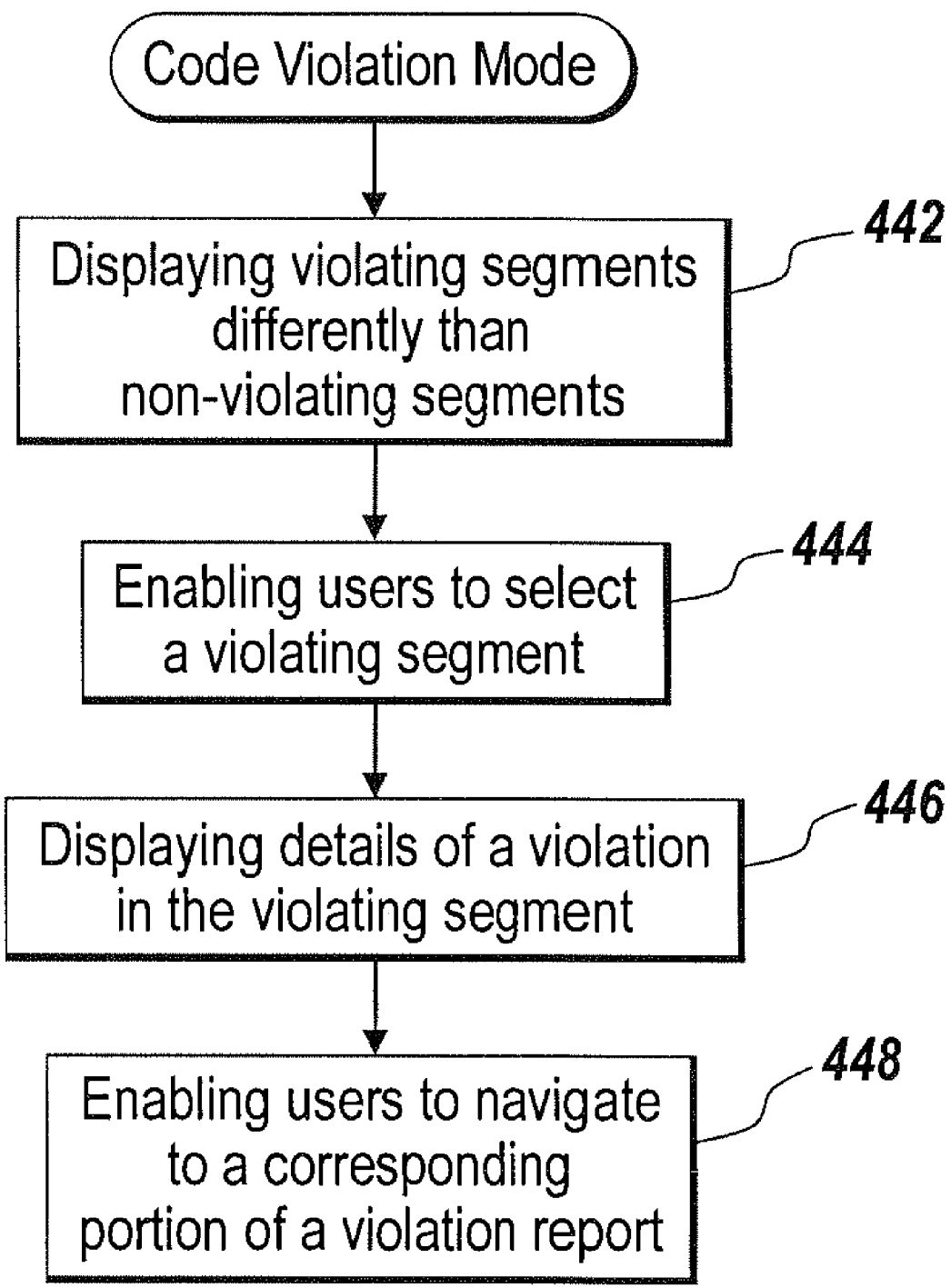
FIG. 9B is a flowchart showing an exemplary operation of a code violation mode.

The block diagram may be put into a code violation mode. FIG. 9B is a flowchart showing an exemplary operation of the code violation mode. In this mode, non-violating segments of the block diagram can be displayed differently than the violating segments of the block diagram (step 442). For example, the non-violating segments of the diagram are colored grey, and violating segments are colored in red. One of skill in the art will appreciate that the non-violating segments and violating segments can be displayed in many different ways. Hovering the mouse 190 over a violation segment (step 444) displays the details of the violation in a tool tip "informer" (step 446). From the informer, users are also able to navigate to corresponding portion of the code violation report (step 448). This workflow allows the users to view coding violations by navigating the Simulink® diagram.

The MISRA-C violation report depicted in FIG. 10 includes a Summary that describes the MISRA-C rules, whether each rule is enabled to check, mitigation strategies including the data for correcting or avoiding the violation of the coding standard in the block diagram, and whether the automatic avoidance is enabled. One of ordinary skill in the art will appreciate that the content of the Summary may be formatted differently depending on the users' selection of options provided in the user interface 800 depicted in FIGS. 8A and 8B. The report 1000 also shows the Violations of the coding standard. The Violations describe that the relational operator 510 of the block diagram 500 violates Rule 50, which requires floating expressions should not be tested for equality or inequality. The Violations also include a hyperlink to the relational operator 510 of the block diagram 500, which violates Rule 50. The violation report also includes users' mitigation strategies, such as the automatic avoidance of the violation in the simulation and code generation of the block diagram, and automatic correction of the current block diagram with a MISRA-Compliant implementation.

Automatic Correction of Violations

FIG. 11 is a flow chart showing an exemplary operation of the illustrative embodiment of the present invention for automatically correcting the block diagram to remove violations. If the checker 320 applies the coding standard to the block diagram and finds the violations of the coding standard, the checker 320 may provide an option to automatically correct the violations of the coding standard in the block diagram. The option can be provided, for example, in the violation report depicted in FIG. 10. If the users select the option provided in the violation report, a corrected block diagram may be displayed to the users.

Figure 12A:
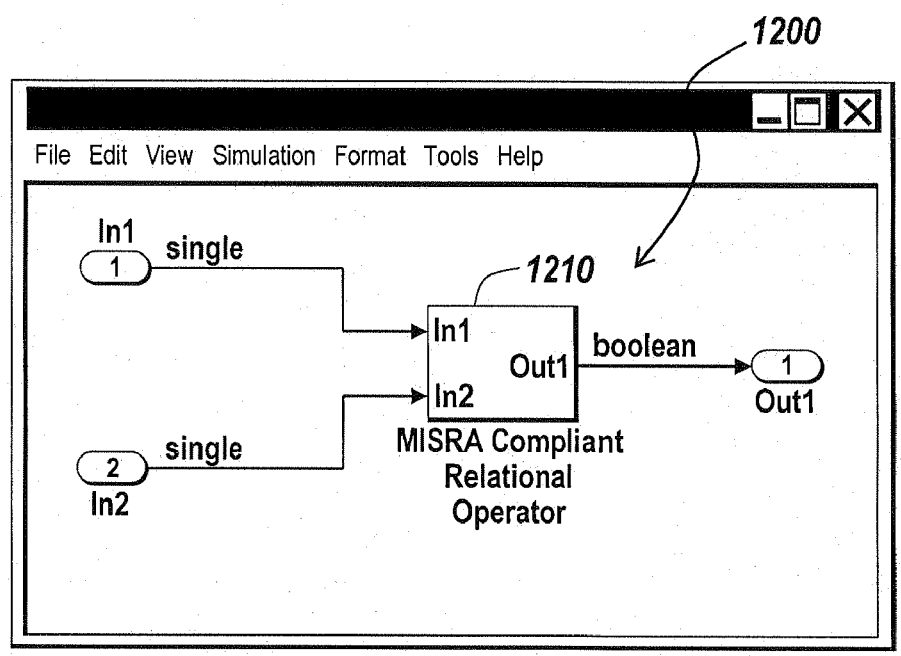
FIG. 12A is an example of a corrected model.
Figure 12B:
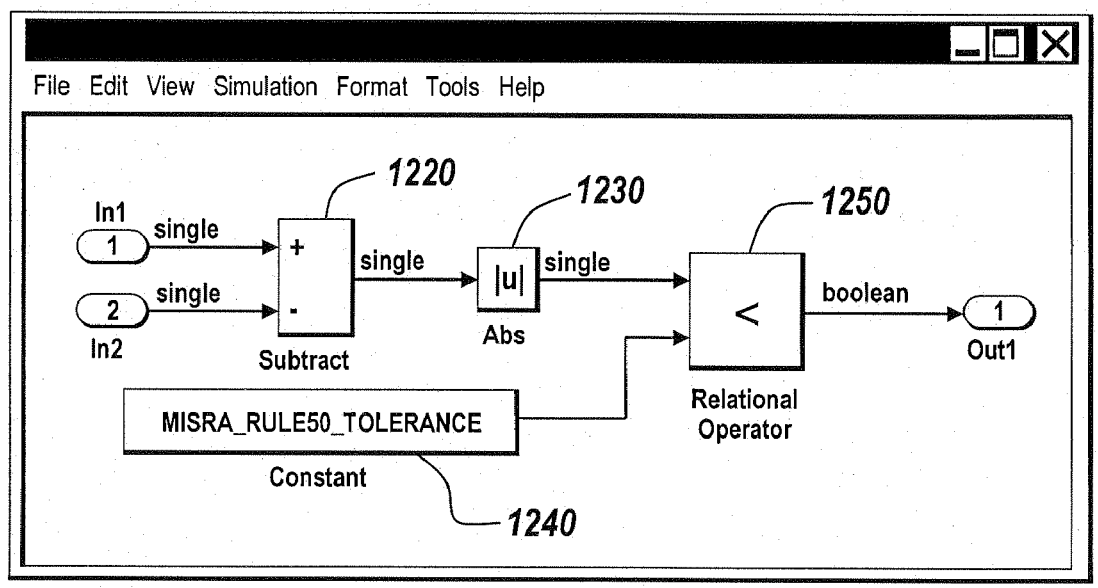
FIG. 12B is a detailed example of a corrected model.

FIG. 12A is an exemplary corrected block diagram 1200 of the Simulink® model 500 depicted in FIG. 5. In the corrected model 1200, the relational operator 510 of the Simulink® model 500 is replaced with a MISRA-C compliant relational operator 1210. FIG. 12B shows the details of the MISRA-C compliant relational operator 1210. The MISRA-C compliant relational operator 1210 includes Subtract 1220, Abs 1230, Constant 1240 and Relational Operator 1250. The Subtract 1220 subtracts the second input (In2) from the first input (In1). The Abs 1230 calculates an absolute value of the subtraction result. The Constant 1240 may contain the tolerance entered by the users using the user interface 800. The Relational Operator 1250 determined if the absolute value of the subtraction result is less than the tolerance in the Constant 1240. If the absolute value of the subtraction result is less than the tolerance in the Constant 1240, the Relational Operator 1250 outputs a Boolean value, true. If the absolute value of the subtraction result is not less than the tolerance in the Constant 1240, the Relational Operator 1250 outputs a Boolean value, false. This same process can be performed for the Stateflow® chart in FIG. 6 and the Embedded MATLAB® functions in FIG. 7.

Automatic Avoidance of Violations in Simulation and/or Code Generation

Figure 13:
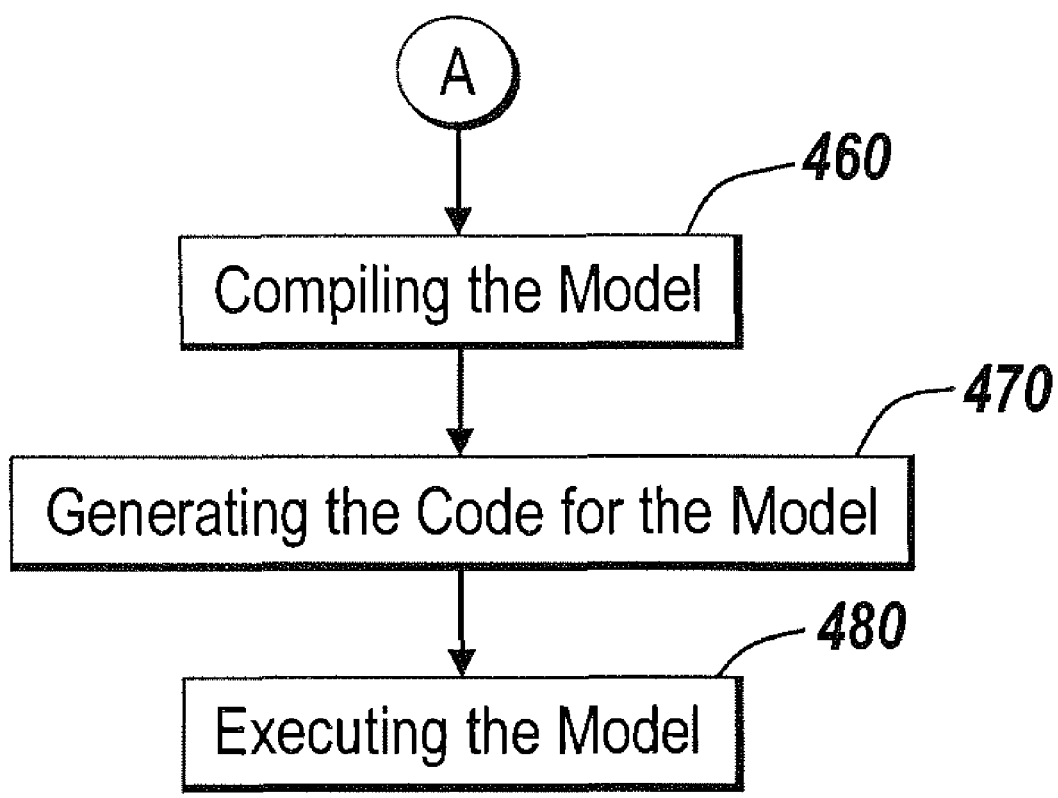
FIG. 13 is a flow chart showing an exemplary operation of the illustrative embodiment of the present invention for avoiding violation in the simulation and code generation of the model.

FIG. 13 is a flow chart showing an exemplary operation of the illustrative embodiment of the present invention for automatically avoiding violations in the simulation and/or code generation of the block diagram. The model processing engine 330 compiles the block diagram to simulate or execute the block diagram (step 460). The model processing engine 330 carries out the task of compiling and linking the block diagram to produce an "in-memory executable" version of the model that is used for generating code and/or simulating or linearizing a block diagram. The compilation stage involves preparing data structures and evaluating parameters, configuring and propagating block characteristics, determining block connectivity, and performing block reduction and block insertion. In the link stage, the model processing engine 330 uses the result of the compiled stage to allocate memory needed for the execution of the various components of the block diagram. The linking stage also produces block method execution lists which are used by the simulation or linearization of the block diagram. After linking has been performed, the code generator 340 may generate code for the block diagram (step 470). If this stage is performed, then the stages that follow use the generated code during the execution of the block diagram (step 480). If this stage is skipped completely, then the execution engine 350 may use an interpretive mode for the execution of the block diagram (step 480).

Figure 14A:
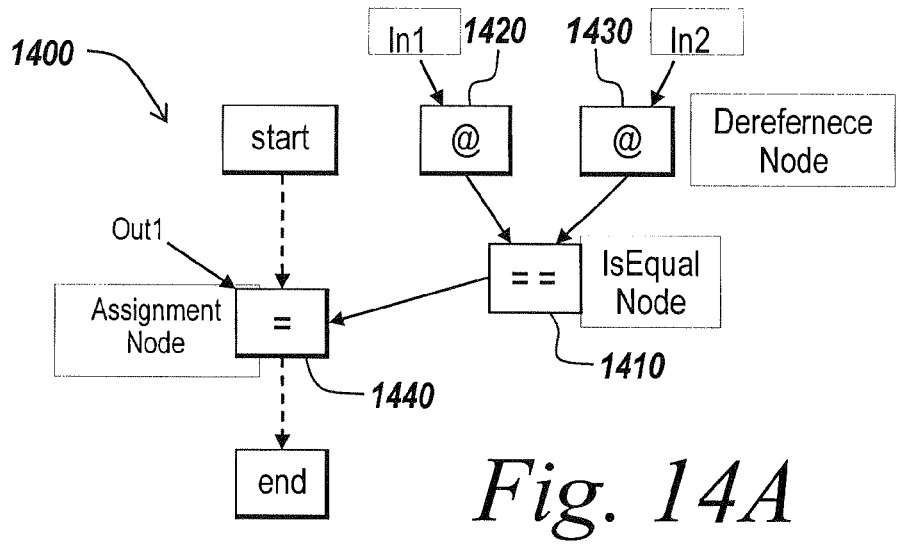
FIG. 14A depicts an abstract syntax tree for the model in FIG. 5.

During the model compilation, the block diagram is converted into an intermediate representation that is used to synthesize the block diagram for execution in simulation and code generation. The intermediate representation is used to sort the blocks into a list of blocks that is used to execute and generate code for the block diagram. FIG. 14A shows an exemplary intermediate representation 1400 of the Simulink® model 500 depicted in FIG. 5. In the intermediate representation of the block diagram, each of the blocks in the block diagram is represented as a node. The intermediate representation 1400 includes nodes 1420 and 1430 for the input ports 520 and 530 and a node 1440 for the output port 540. The intermediate representation 1400 also includes a node 1410 for the relational operator 510. The nodes 1410-1440 are coupled by arrows.

Figure 14B:
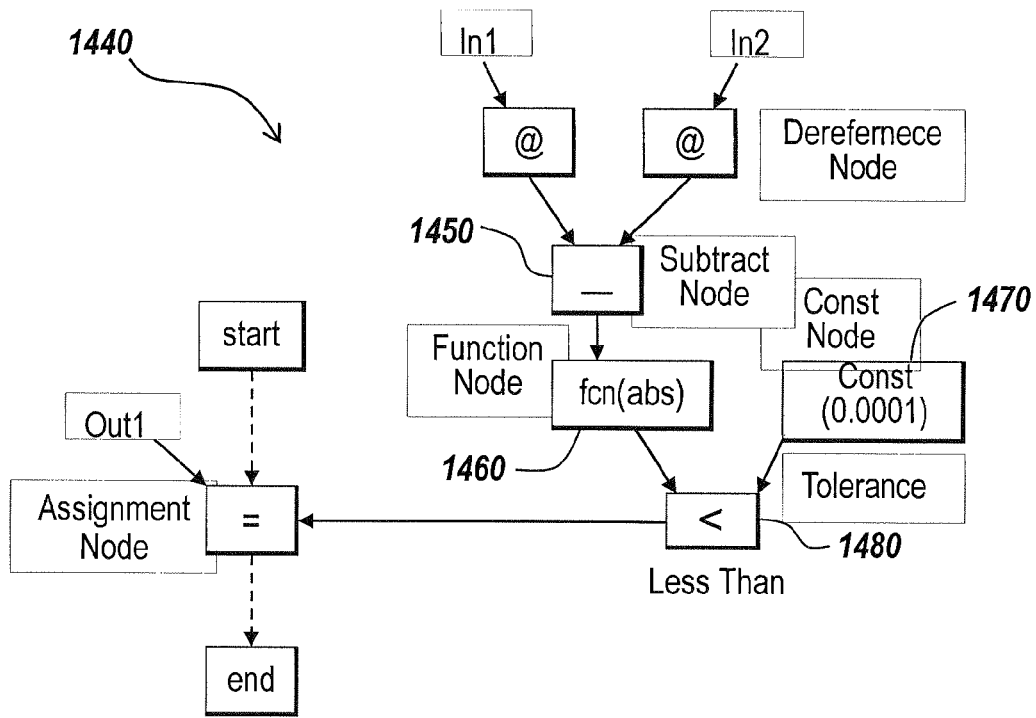
FIG. 14B depicts a detailed abstract syntax tree for the model in FIG. 12B.

When users select an option for automatically avoiding the violations of the coding standard, such as the option 820 provided in the user interface 800, the model processing engine 330 automatically build a coding standard compliant intermediate representation 1440 of the block diagram, as depicted in FIG. 14B, instead of the intermediate representation 1400 of the block diagram depicted in FIG. 14A. The coding standard compliant intermediate representation 1440 include nodes 1450-1480 for Substract, Abs function, Constant and Less Than, instead of the node 1430 for the relational operator 510. One of ordinary skill in the art will appreciate that the coding standard compliant intermediate representation 1440 may correspond to the intermediate representation of the corrected block diagram described above with reference to FIG. 12B. With the coding standard compliant intermediate representation 1440, the block diagram can be compiled to execute/simulate without the violations of the coding standard. With the coding standard compliant intermediate representation 1440, code for the block diagram can be generated that does not violate the coding standard. Exemplary C code generated based on the coding standard compliant intermediary representation 1440 is listed as follows.

```
if (fabs(in1-in2) < 0.0001) {
    Out1 = true;
else {
    Out1 = false;
}
```

The illustrative embodiment of the present invention is described primarily based on time-based block diagrams to illustrate the application of coding standards to graphical models. The present invention may generally be extended to other graphical modeling domains and computation models in which graphical diagrams are employed.

One of ordinary skill in the art will appreciate that the present invention may be implemented in other graphical modeling domains including a "data flow" modeling environment that provides a graphical means of showings an imperative programming environment. In the data flow modeling environment, nodes typically represent operations and execution is often illustrated via the use of tokens, though implementations in practice don't use tokens. Following the steps provided in this disclosure, those of ordinary skill in the art can apply coding standards to the data flow modeling domain.

It will be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any graphical modeling environments. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. A computer-implemented method comprising:
providing a coding standard in a graphical modeling environment;
applying the coding standard to at least a portion of a graphical model in the graphical modeling environment to detect a violating segment of the graphical model that violates the coding standard;
displaying the violating segment of the graphical model differently than a non-violating segment of the graphical model;
displaying information on violation of the coding standard associated with the violating segment of the graphical model;
automatically generating a coding standard compliant intermediate representation of the graphical model;
compiling the graphical model for execution using the coding standard compliant intermediate representation of the graphical model; and
generating code for the compiled graphical model.

2. The method of claim 1, further comprising:
selecting one or more portions of the graphical model; and
applying the coding standard to the selected one or more portions of the graphical model.

3. The method of claim 1, further comprising:
selecting one or more portions of the graphical model; and
exempting the selected one or more portions of the graphical model from applying the coding standard.

4. The method of claim 3, further comprising:
annotating the selected one or more portions of the graphical model; and
generating a report that includes the annotated one or more portions of the graphical model.

5. The method of claim 1, wherein the coding standard is customized to be applied to the at least a portion of the graphical model.

6. The method of claim 1, further comprising:
selecting one or more strategies for applying the coding standard to at least a portion of the graphical model.

7. The method of claim 6, wherein the one or more strategies include an automatic violation avoidance during simulation of the graphical model.

8. The method of claim 6, wherein the one or more strategies include an automatic violation avoidance during code generation for the graphical model.

9. The method of claim 1, wherein the compiled graphical model is free of violations of the coding standard.

10. A storage for holding computer-executable instructions, the instructions comprising instructions for:
providing a coding standard in a graphical modeling environment;
applying the coding standard to at least a portion of a graphical model in the graphical modeling environment to detect a violating segment of the graphical model that violates the coding standard;
displaying the violating segment of the graphical model differently than a non-violating segment of the graphical model;
displaying information on violation of the coding standard associated with the violating segment of the graphical model
automatically generating a coding standard compliant intermediate representation of the graphical model;
compiling the graphical model for execution using the coding standard compliant intermediate representation of the graphical model; and
generating code for the compiled graphical model.

11. The storage of claim 10, further comprising instructions for:
selecting one or more portions of the graphical model; and
applying the coding standard to the selected one or more portions of the graphical model.

12. The storage of claim 10, further comprising instructions for:
selecting one or more portions of the graphical model; and
exempting the selected one or more portions of the graphical model from applying the coding standard.

13. The storage of claim 12, further comprising:
annotating the selected one or more portions of the graphical model; and
generating a report that includes the annotated one or more portions of the graphical model.

14. The storage of claim 10, wherein the coding standard is customized to be applied to the at least a portion of the graphical model.

15. The storage of claim 10, further comprising instructions for:
selecting one or more strategies for applying the coding standard to at least a portion of the graphical model.

16. The storage of claim 15, wherein the one or more strategies include an automatic violation avoidance during simulation of the graphical model.

17. The storage of claim 15, wherein the one or more strategies include an automatic violation avoidance during code generation for the graphical model.

18. The storage of claim 10,
wherein the compiled graphical model is free of violations of the coding standard.

19. A system comprising:
a storage containing at least a coding standard in a graphical modeling environment;
a processor configured to:
apply the coding standard to at least a portion of a graphical model in the graphical modeling environment to detect a violating segment of the graphical model that violates the coding standard;
automatically generate a coding standard compliant intermediate representation of the graphical model;
compile the graphical model for execution using the coding standard compliant intermediate representation of the graphical model; and
generate code for the compiled graphical model; and
a display device configured to:
display the violating segment of the graphical model differently than a non-violating segment of the graphical model; and
display information on violation of the coding standard associated with the violating segment of the graphical model.

20. The system of claim 19, further comprising:
an interface that allows selecting one or more portions of the graphical model, wherein the coding standard is applied to the selected one or more portions of the graphical model.

21. The system of claim 20, further comprising:
an interface that allows annotating the selected one or more portions of the graphical model, wherein the processor is further configured to generate a report that includes annotated one or more portions of the graphical model.

22. The system of claim 19, further comprising:
an interface that allows selecting one or more strategies for applying the coding standard to at least a portion of the graphical model.

23. The system of claim 22, wherein the one or more strategies include automatic violation avoidance during simulation of the graphical model.

24. The system of claim 22, wherein the one or more strategies include automatic violation avoidance during code generation for the graphical model.

* * * * *